United States Patent
Jeon et al.

(10) Patent No.: US 9,120,070 B2
(45) Date of Patent: *Sep. 1, 2015

(54) STAMPING APPARATUS FOR BIOCHIPS AND METHOD FOR OPERATION THEREOF

(75) Inventors: Sang Youl Jeon, Gyunggi-do (KR); Sang Jin Kim, Gyunggi-do (KR); Jeong Suong Yang, Gyunggi-do (KR); Bo Sung Ku, Gyunggi-do (KR)

(73) Assignee: Samsung Electro-Mechanics Co., Ltd., Suwon-Si (KR)

( * ) Notice: Subject to any disclaimer, the term of this patent is extended or adjusted under 35 U.S.C. 154(b) by 583 days.

This patent is subject to a terminal disclaimer.

(21) Appl. No.: 12/848,888

(22) Filed: Aug. 2, 2010

(65) Prior Publication Data

US 2011/0294703 A1     Dec. 1, 2011

(30) Foreign Application Priority Data

May 25, 2010 (KR) .................. 10-2010-0048780

(51) Int. Cl.
*C40B 60/14* (2006.01)
*B01J 19/00* (2006.01)

(52) U.S. Cl.
CPC ............. *B01J 19/0046* (2013.01); *C40B 60/14* (2013.01); *B01J 2219/00382* (2013.01); *B01J 2219/00385* (2013.01); *B01J 2219/00529* (2013.01); *B01J 2219/00533* (2013.01); *B01J 2219/00722* (2013.01)

(58) Field of Classification Search
None
See application file for complete search history.

(56) References Cited

U.S. PATENT DOCUMENTS

| | | | |
|---|---|---|---|
| 2003/0087292 A1* | 5/2003 | Chen et al. ................. | 435/6 |
| 2008/0310094 A1* | 12/2008 | Burns ........................ | 361/683 |
| 2011/0124116 A1* | 5/2011 | Wohlstadter et al. ...... | 436/172 |

* cited by examiner

*Primary Examiner* — Christopher M Gross
(74) *Attorney, Agent, or Firm* — NSIP Law (57) ABSTRACT

Disclosed herein is a stamping apparatus for biochips and a method of operating the stamping apparatus. The apparatus includes a table, a first chip table, a second chip table, a stamping unit and a control unit. The first chip table is provided on the table. A first biochip is seated onto the first ship table. A second biochip is seated onto the second chip table. The stamping unit is mounted to the table and operates the second chip table such that a surface of a junction of the second biochip seated on the second chip table is joined to a surface of a junction of the first biochip seated on the first chip table. The control unit controls operation of the first chip table or the second chip table.

6 Claims, 7 Drawing Sheets

STAMPING APPARATUS FOR BIOCHIPS AND METHOD FOR OPERATION THEREOF

CROSS REFERENCE TO RELATED APPLICATION

This application claims the benefit of Korean Patent Application No. 10-2010-0048780, filed May 25, 2010, entitled "Stamping device for biochip and method for the operating thereof", which is hereby incorporated by reference in its entirety into this application.

BACKGROUND OF THE INVENTION

1. Technical Field

The present invention relates to a stamping device for biochips and a method for the operation thereof.

2. Description of the Related Art

In biochemistry and molecular biology, almost all biological phenomena result from biomolecular recognitions and functional interactions between biomolecules and biomolecules, such as genes and genes, proteins and proteins, proteins and ligands (a ligand is an ion or molecule that binds to a central metal atom to form a coordination complex), ligands and receptors, antibodies and antigens, enzymes and substrates, etc. Thus, studies on interactions or recognition between biomolecues is now arising as important subjects in various fields of the biological science. For example, analyses of interactions between biomolecules may allow the early diagnosis of diseases or the identification of disease causes, may lead to analyses of signaling pathways in the body and to proteomics (analysis of protein functions or roles), and may provide decisive factors for the development of high throughput screening (HTS) systems for new drugs. In addition, these studies have very important influence on the "bioelectronics" aiming to developing electronics based on biomolecules, and the "biocomputer" field using highly specific binding molecules such as DNA/RNA.

A biochip refers to a microfluidic device in which DNAs, proteins, enzymes, ligands, and/or other chemical and biological samples are highly integrated in a microarray pattern on a solid substrate (silicon, metal, glass, etc.) that is designed to rapidly detect or analyze target biomolecules at the same time on the basis of specific interaction between the target biomolecules and the surface-immobilized or arrayed molecules, thereby attaining biological information such as gene expression and association, or protein distribution, or achieving higher throughput and speed in biochemical process, reaction rate or information processing.

A biochip may be a microarray chip such as a DNA chip for detecting diseases or genes, to which microfluidics dealing with the behavior of fluids such as blood or cells in designed microchennels may be applied. It is also called lap-on-a-chip or microTas (short for micrometer(μ)-scale total analysis system). In combination with optics, microfluidics has recently developed to optofluidics. The major application of microfluidics is analysis. It requires only small volumes of samples and reagents, allow the separation and detection of target molecules at high resolution and sensitivity and at low cost, and offers short reaction and analysis times, featuring a very small size device and a thin layer. Therefore, microfluidics offers new functions of controlling association and dissociation of molecules in time and space.

If new promising drug candidates under development will be determined as being toxic by an animal test, an immense loss is generated in the time and money took to develop the drugs. This is a big problem that must be solved in the medicinal/pharmaceutical industry or the cosmetic industry. Conventional toxicity assays employ animal or tissue samples and require a lot of time and money.

As a solution to this problem, a biochip is provided for toxicity assays. It makes possible to perform toxicity assay simply and easily in advance without the need of animal tests. The DataChip (data analysis toxicology assay chip) is representative of the biochips for high-throughput toxicity screening of drug candidates. In this regard, DataChip is prepared by spotting a collagen-encapsulated cell suspension atop each collagen spot overlaid with hyaluronan and covering the DataChip slide with the collagen-gel drops containing MCF7 cells with a sterile glass slide. When the chip is placed in an incubator, the cells grow in a three-dimensional manner. For immediate toxicity assay, various chemicals or drug candidates may be placed on the hepatic cells which are encapsulated in the collagen spots on the chip Further, the toxicity of drug candidates was also studied with a model emulating the human liver because most drugs are metabolized in the liver. Even if a drug is non-toxic, its metabolites are generated by the liver. The MetaChip mimics the effects of metabolism in the human liver where drugs are metabolized. In the MetaChip, metabolism starts immediately after liver enzymes are exposed to drug candidates at respective spots on the chip slide. The two chips, MetaChip and DataChip may be used in combination. When combined with the MetaChip in a sandwich pattern, the DataChip can analyze the metabolites produced by the MetaChip and determine whether the metabolites are toxic or not. Thus, the fusion of these two chips allows high throughput screening (HTS) makes it possible to apply any type of cellular meolecules to the DataChip. Thus, cells of other organs as well as hepatic cells can be tested. For example, the conjunction of the DataChip with the MetaChip enables various compounds to be assayed for toxicity to dermal cells, thus finding applications in the development of cosmetics.

Nowadays, drug candidates can be, as described above, assayed for toxicity using a combination of the DataChip and the MetaChip in a sandwich pattern. The conjunction of the DataChip with the MetaChip is usually achieved by immobilizing the chips to respective stamping jigs, followed by combining the chips with each other with the position adjusted by a pin. After the combined DataChip and MetaChip is fixed, the upper frame is removed to give a biochip, a combination of the DataChip and the MetaChip. However, manual stamping processes are relatively poor in efficiency upon repetition and do not ensure accurate positioning and conjunction for the DataChip and the MetaChip, decreasing the reliability of the toxicity assay. In addition, manual stamping processes are too bothersome because they must be individually conducted for various drug candidates, as well as producing problems in accuracy and reliability.

SUMMARY OF THE INVENTION

The present invention has been made in an effort to provide a stamping device for biochips and a method for the operation thereof wherein a series of operations of joining and fastening two kinds of biochips to each other is automated and the biochips are analyzed, thus enhancing the precision and reliability of the process, and a lot of biochips can be rapidly and easily processed during each process.

In a stamping apparatus for biochips according to an embodiment of the present invention, a table is provided. A first chip table is provided on one side of the table. The first chip table has one side onto which a first biochip is seated. A second chip table has one side onto which a second biochip is seated. A stamping unit is mounted to the table. The stamping unit operates the second chip table so that a surface of a junction of the second biochip seated on the second chip table is joined to a corresponding surface of a junction of the first biochip seated on the first chip table. A control unit controls operation of the first chip table or the second chip table.

A tilting unit may be coupled to the table to operate the table in a seesaw manner.

The tilting unit may comprise a tilting motor.

A fastening unit may maintain the joined state of the first and second biochips.

The fastening unit may comprise a magnet.

A surrounding condition controller may control surrounding conditions of the first biochip and the second biochip.

The fastening unit may comprise a clip.

In a stamping apparatus for biochips according to another embodiment of the present invention, a table is provided. A first chip table has one side onto which a first biochip is seated. A second chip table has one side onto which a second biochip is seated. A linear movable unit is mounted to the table to linearly move the first chip table. A stamping unit is mounted to the table. The stamping unit includes a rotary unit rotating the second chip table, and a vertical movable unit moving the second chip table in a vertical direction. A control unit controls positions and movement of the first chip table and the second chip table. The second chip table is operated in the vertical direction by the vertical movable unit so that the side of the second chip table is joined to the corresponding side of the first chip table.

A tilting unit may comprise a seesaw unit operating the first chip table in a seesaw manner.

A fastening unit may maintain the joined state of the first and second biochips.

A surrounding condition controller may control surrounding conditions of the first biochip and the second biochip.

The fastening unit may comprise a magnet.

The fastening unit may comprise a clip.

In a method of operating a stamping apparatus for biochips according to an embodiment of the present invention, a first biochip and a second biochip are respectively seated onto one side of a first chip table and one side of a second chip table which are provided on a table. A tilting unit is operated to seesaw the table so that an aqueous solution is removed from the first biochip or the second biochip. A stamping unit is operated to move the second chip table so that a surface of a junction of the second biochip seated on the second chip table is joined to a corresponding surface of a junction of the first biochip seated on the first chip table. The joined first and second biochips are fastened to each other by a fastening unit. The stamping unit is operated to return the second chip table, from which the second biochip is removed, to an original position thereof. The fastened first and second biochips are separated from the first chip table.

The fastening unit may comprise a magnet.

The fastening unit may comprise a clip.

The first biochip and the second biochip may be seated onto the first chip table and the second chip table by vacuum suction force. The operating of the stamping unit to move the second chip table may comprise releasing the vacuum suction force with which the second biochip is held on the second chip table. The fastened first and second biochips may be separated from the first chip table by relieving the vacuum suction force with which the first biochip is held on the first chip table.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components. In the following description, when it is determined that the detailed description of the conventional function and conventional structure would confuse the gist of the present invention, such a description may be omitted. Furthermore, the terms and words used in the specification and claims are not necessarily limited to typical or dictionary meanings, but must be understood to indicate concepts selected by the inventor as the best method of illustrating the present invention, and must be interpreted as having had their meanings and concepts adapted to the scope and sprit of the present invention so that the technology of the present invention could be better understood.

Hereinafter, embodiments of the present invention will be described in detail with reference to the attached drawings.

Figure 1:
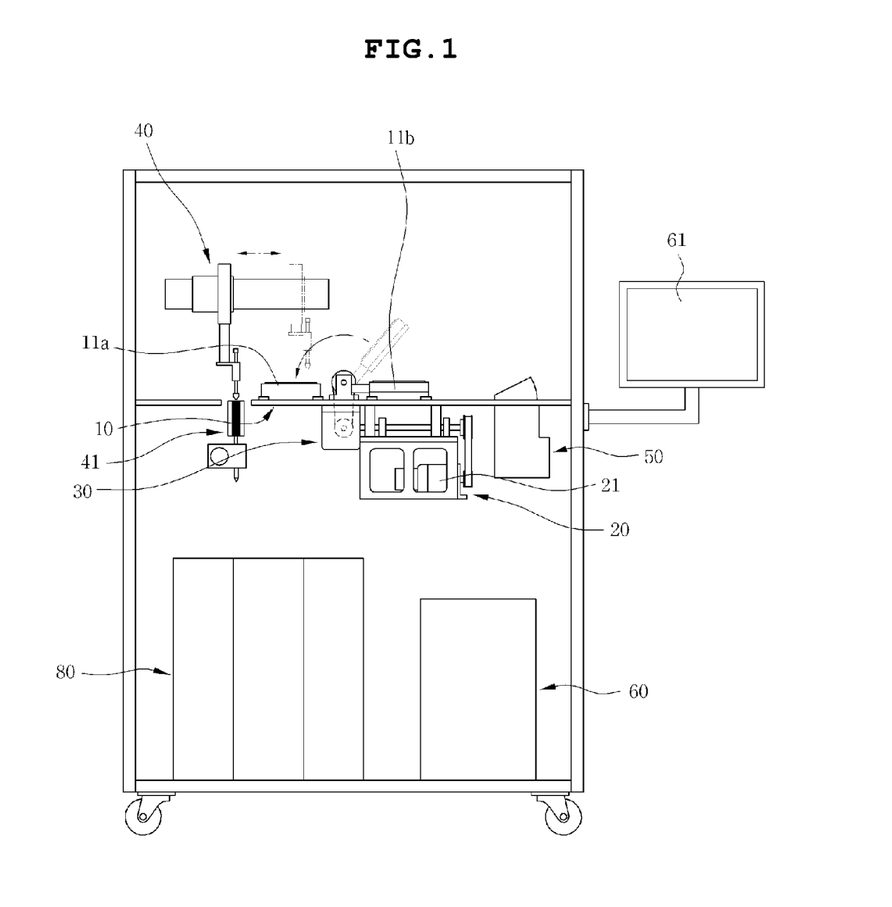
FIG. 1 is a front view of a stamping apparatus for biochips, according to a first embodiment of the present invention.
Figure 2:
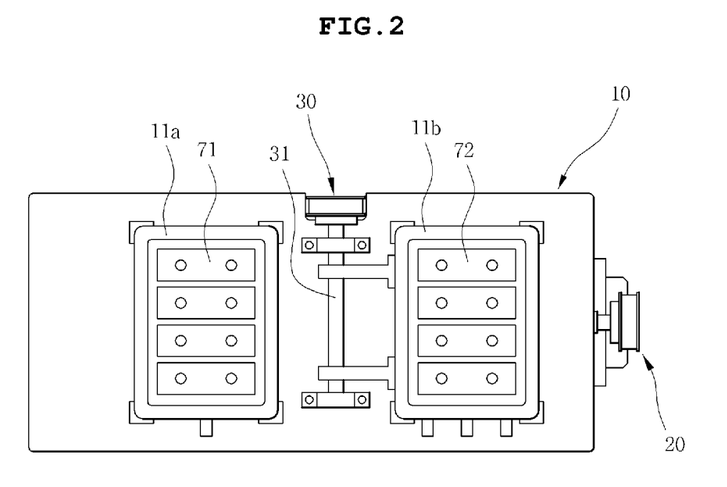
FIG. 2 is a plan view of the table of FIG. 1.
Figure 3:
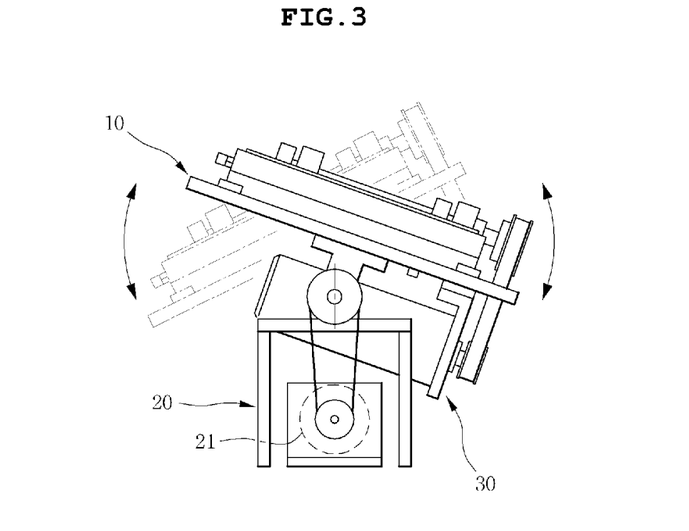
FIG. 3 is a view showing a seesaw motion of the table using a tilting unit according to the present invention.
Figure 4:
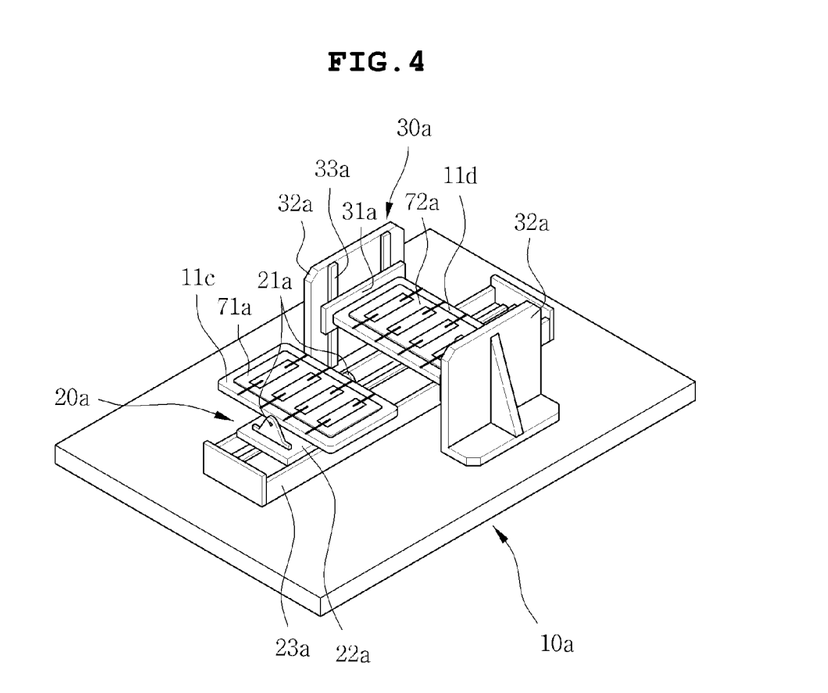
FIGS. 4 through 7 are views illustrating the operation of a stamping apparatus for biochips, according to a second embodiment of the present invention.
Figure 5:
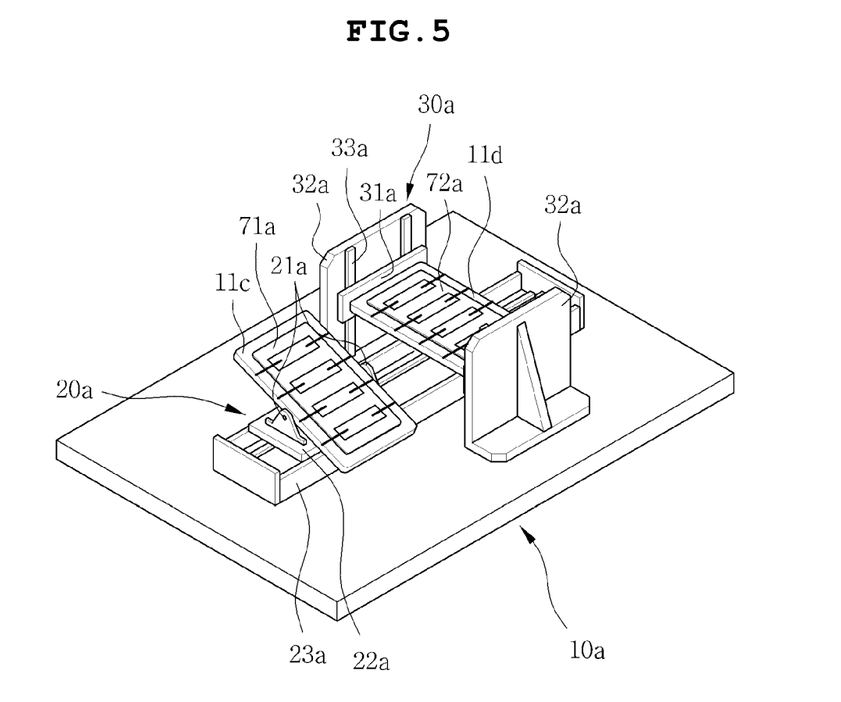
Figure 6:
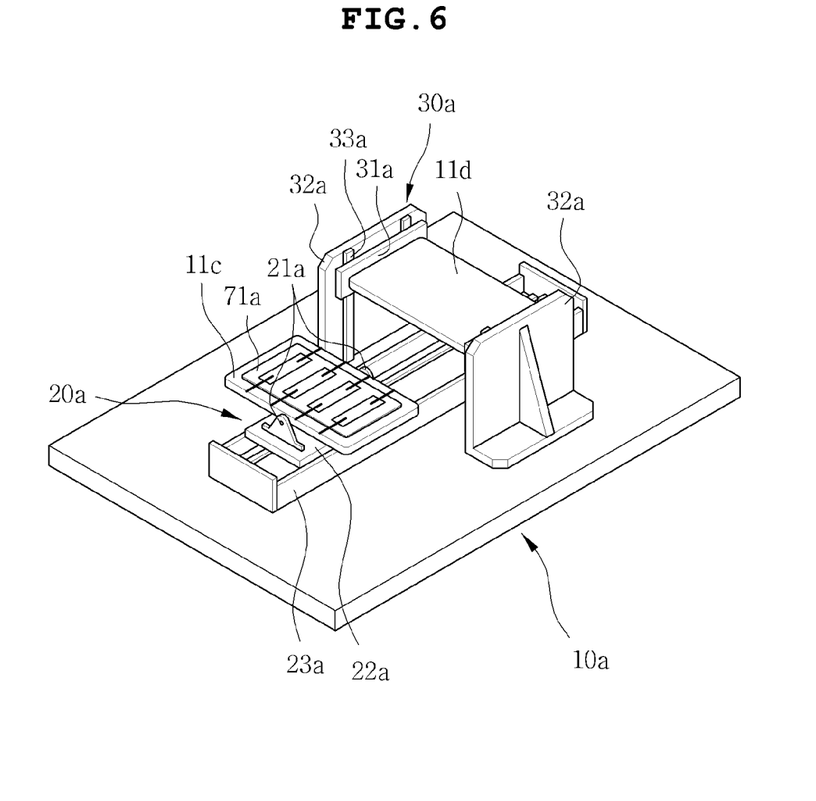
Figure 7:
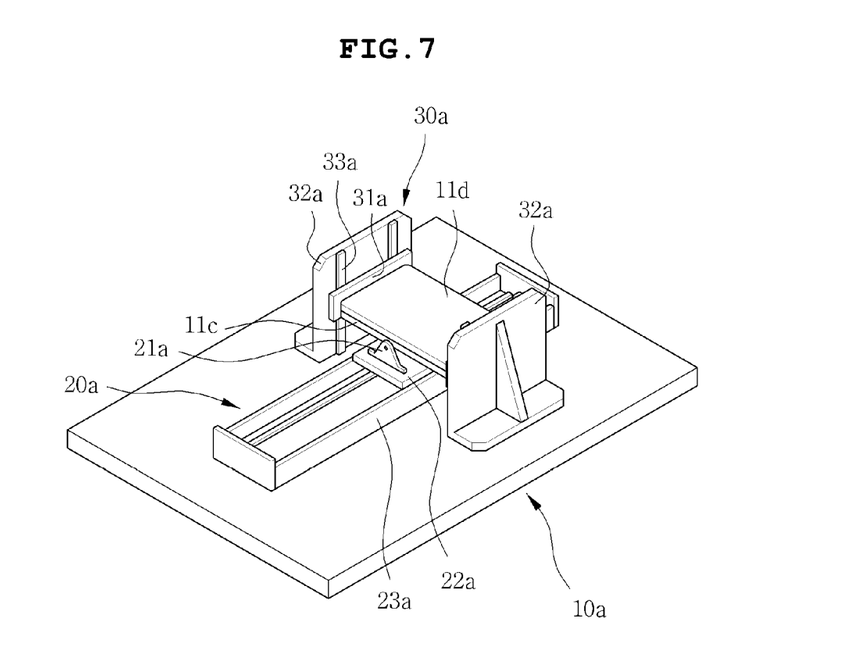

FIG. 1 is a front view of a stamping apparatus for biochips, according to a first embodiment of the present invention. FIG. 2 is a plan view of a table 10 provided with a first chip table 11a and a second chip table 11b of FIG. 1. FIG. 3 is a view showing a seesaw motion of the table 10 using a tilting unit 20 according to the present invention.

The stamping apparatus according to the first embodiment of the present invention includes a table 10, a first chip table 11a, a second chip table 11b, a stamping unit 30 and a control unit 60. The first chip table 11a is provided on an upper surface of the table 10. A first biochip 71 is seated onto the first chip table 11a. The second chip table 11b is provided on the upper surface of the table 10. A second biochip 72 is seated onto the second chip table 11b. The stamping unit 30 is mounted to the table 10 and rotates the second chip table 11b so that a surface of junction of the second biochip 72 seated on the second chip table 11b is joined to a surface of junction of the first biochip 71 seated on the first chip table 11a. The control unit 60 controls the operation of the first chip table 11a or the second chip table 11b.

As such, the first chip table 11a and the second chip table 11b onto which the first biochip 71 and the second biochip 72 are respectively seated are supported on the table 10.

In detail, the first biochip 71 is held on the first chip table 11a by vacuum suction force. A suction pump may be used to generate vacuum suction force. Other various devices or methods can be used to reliably support the first biochip 71 on the first chip table 11a. A first magnet may be provided on a seating surface of the first chip table 11a onto which the first biochip 71 is seated, thus maintaining the junction between the first biochip 71 and the second biochip 72. In this case, a second magnet may be provided on the second chip table 11b at a position corresponding to the first magnet, such that when the corresponding surface of the second biochip 72 is joined to the first biochip 71, the opposite poles of the first and second magnets face each other to generate attractive force therebetween. Thereby, the first biochip 71 and the second biochip 72 can be more reliably joined to each other. The first biochip 71 may comprise a DataChip or a MetaChip. In addition, various biochips can be used as the first biochip 71, so long as they can be joined to the second biochip 72 and used to test the toxicity of medicines or the like. Furthermore, the first chip table 11*a* may be configured such that a plurality of first biochips 71 is seated on the first chip table 11*a* so as to process the several first biochips 71 at the same time. FIG. 2 illustrates the configuration in which the several first biochips 71 are arranged along the longitudinal direction of the first chip table 11*a*. Furthermore, the present invention is not limited to the configuration of FIG. 2. The first biochips 71 can be arranged in various manners and configurations, so long as each first biochip 71 is correctly joined to the corresponding second biochip 72.

The second biochip 72 is seated onto the corresponding surface of the second chip table 11*b*. The second chip table 11*b* is operated by the stamping unit 30 to conduct the stamping process for joining the second biochip 72 placed on the second chip table 11*b* to the first biochip 71 placed on the first chip table 11*a*. As shown in FIG. 2, the second chip table 11*b* is connected to a rotating shaft 31 and rotated around the rotating shaft 31 so that the corresponding surface thereof is joined to the first chip table 11*a*. The operation of the second chip table 11*b* is not limited to the rotational motion. In other words, the operation of the second chip table 11*b* for joining the second biochip 72 to the first biochip 71 can be realized in various manners. In the embodiment, the second biochip 72 may be held by the second chip table 11*b* by vacuum suction force. A suction pump may be used to generate vacuum suction force. Other various devices or methods can be used to reliably support the second biochip 72 on the second chip table 11*b*. The second biochip 72 may also comprise a DataChip or a MetaChip. In addition, various biochips can be used as the second biochip 72, so long as it can be joined to the first biochip 71 and be used to test the toxicity of medicines or the like. Furthermore, the second chip table 11*b* may be configured such that a plurality of second biochips 72 is placed on the second chip table 11*b* so as to involve the several second biochips 72 in the stamping process at the same time. In FIG. 2, the several second biochips 72 are arranged along the longitudinal direction of the second chip table 11*b*. Furthermore, the arrangement of the second biochips 72 is not limited to this. The second biochips 72 can be arranged on the second chip table 11*b* in various manners and configurations, so long as the second biochips 72 can be placed on the same plane such that they are correctly joined to the corresponding first biochips 71.

The stamping unit 30 is mounted to the table 10. The stamping unit 30 operates the second chip table 11*b* using a drive motor (not shown) or the like. Of course, a means for operating the second chip table 11*b* is not limited to the drive motor, and various drive means can be used. Furthermore, the second chip table 11*b* is operated so that the first biochips 71 placed on the first chip table 11*a* are joined to the corresponding second biochips 72 placed on the second chip table 11*b*. As shown in FIG. 1, in the embodiment, the second chip table 11*b* is rotated by the stamping unit 30 in the direction designated by the arrow, but the operation of the second chip table 11*b* is not limited to this. For example, the operation of the second chip table 11*b* may comprise a combination of rotational motion and linear motion. After the second biochips 72 are joined to the first biochips 71, the stamping unit 30 which has rotated the second chip table 11*b* to join the second biochips 72 to the first biochips 71 rotates the second chip table 11*b*, from which the second biochips 72 are separated, to its original position. In the case of the structure in which the second biochips 72 are held on the second chip table 11*b* by vacuum suction force, the second biochips 72 can be separated from the second chip table 11*b* by relieving the vacuum suction force, before the second chip table 11*b* is returned to its original position by the stamping unit 30. In the embodiment, the stamping unit 30 includes the rotating shaft 31 which serves as a center shaft around which the second chip table 11*b* is rotated onto the first chip table 11*a*.

The stamping apparatus according to the present invention may further include a tilting unit 20 which is coupled to the table 10 to operate the table 10 in a seesaw manner. The tilting unit 20 includes a tilting motor 21. The operation of tilting the table 10 in a seesaw manner functions to drain aqueous solution, such as culture fluid, out of the first biochips 71 or the second biochips 72.

As shown in FIG. 3, the tilting unit 20 functions to move the table 10 in a seesaw manner. When the table 10 is moved in a seesaw manner, the aqueous solution, such as culture fluid, flows out of the first biochips 71 or the second biochips 72. Thereby, the reliability in joining the first biochips 71 to the second biochips 72 can be enhanced. Specially, in the case where each of the first and second biochips 71 and 72 comprises a DataChip or a MetaChip, culture fluid must be discharged from the chip to reliably join the first biochips 71 to the second biochips 72. For this, it is desirable that the tilting unit 20 be used to move the entire table 10 in a seesaw manner. It is easily understood that modification of the design of the present invention to couple the tilting unit 20 to the table 10 for operating the table 10 in a seesaw manner fall within the bounds of the present invention. In the embodiment, the tilting unit 20 basically includes the tilting motor 21 to operate the table 10 in a seesaw manner and may further include various devices, making the seesaw movement of the table 10 possible.

The control unit 60 controls the operation of the first and second chip tables 11*a* and 11*b* in such a way as to control the stamping unit 30 and the tilting unit 20. In detail, the control unit 60 controls the stamping unit 30 to control the start of the operation of the second chip table 11*b*, the operating direction and the position of the second chip table 11*b*, and the operation of returning the second chip table 11*b* to its original position. Furthermore, the control unit 60 controls the tilting unit 20 such that the table 10 is tilted at an appropriate angle during the seesaw operation and controls the operating time of the tilting unit 20 which takes into account the time taken to completely remove the aqueous solution from the biochips. As such, the control unit 60 controls the overall operation of the stamping apparatus. The control unit 60 may further include an input and display unit 61 through which an operator inputs desired operating signals to the apparatus and which displays the output values. The input and display unit 61 may comprise a touch screen, an LCD or other various display devices.

Meanwhile, the stamping apparatus of the present invention may further include a fastening unit which maintains the joined state of the first and second biochips 71 and 72. In the embodiment, the second biochips 72 are joined to the corresponding first biochips 71 in such a way that the second chip table 11*b* is placed onto the first chip table 11*a* by the stamping unit 30. To enhance the precision and reliability of the joining of the first and second biochips 71 and 72, the fastening unit functions to hold the first and second biochips 71 and 72 to maintain the joined state. The fastening unit may be realized by a method using attractive force generated between magnets or using a clip. In addition to the magnets or clip, other various devices and methods can be provided to maintain the joined state of the first and second biochips 71 and 72. In the embodiment, as shown in FIG. 1, an automatic magnet feeding device 40 including a magnet feeding unit 41 is used to maintain the joined state of the first and second biochips 71 and 72. The automatic magnet feeding device 40 disposes magnets at predetermined positions so that fastening the biochips to each other is conducted automatically. The supply of magnets by the magnet feeding unit 41 makes the operation of joining and fastening the biochips to each other smoother.

The stamping apparatus of the present invention further includes a surrounding condition controller 50 which sets and controls surrounding conditions, such as the temperature, a humidity, etc., of the first biochips 71 or the second biochips 72. Typically, biochips containing cells, cell culture fluid, etc., are easily affected by surrounding conditions, so that a correct test result may not be obtained. To avoid this problem, the surrounding condition controller 50 sets the surrounding conditions of the biochips to the optimal state, thus ensuring the precision and reliability of the result of tests involving the interaction of the biochips joined to each other.

FIGS. 4 through 7 are views illustrating the operation of a stamping apparatus for biochips, according to a second embodiment of the present invention. Hereinafter, the construction and operation of the stamping apparatus according to the second embodiment will be described in detail. The explanation of its construction and operation which are the same as those of the first embodiment will be omitted.

The stamping apparatus according to the second embodiment of the present invention includes a table 10a, a first chip table 11c, a second chip table 11d, a linear movable unit 23a, a stamping unit 30a and a control unit (not shown). A first biochip 71a is seated onto one side of the first chip table 11c. A second biochip 72a is seated onto one side of the second chip table 11d. The linear movable unit 23a linearly operates the first chip table 11c. The stamping unit 30a is mounted to the table 10a and includes a rotary unit 31a which rotates the second chip table 11d, and a vertical movable unit 32a which vertically operates the second chip table 11d. The control unit controls the positions and operation of the first chip table 11c and the second chip table 11d. The second chip table 11d is operated in the vertical direction by the vertical movable unit 32a so that the side of the second chip table 11d is joined to the corresponding side of the first chip table 11c.

The stamping apparatus of the second embodiment further includes a tilting unit 20a which is mounted to the table 10. The tilting unit 20a includes a seesaw unit 22a which operates the first chip table 11c in a seesaw manner.

In detail, the tilting unit 20a is provided on the table 10a and includes the linear movable unit 23a and the seesaw unit 22a. The linear movable unit 23a functions to linearly move the first chip table 11c to a predetermined position at which the first chip table 11c is joined to the second chip table 11d. The linear motion of the first chip table 11c may be implemented by a rail (refer to FIGS. 6 and 7) or, alternatively, it may be realized by various other methods. The seesaw unit 22a seesaws the first chip table 11c to drain aqueous solution out of the first biochip 71a seated on the first chip table 11c (refer to FIG. 5). In the second embodiment, a DataChip which requires the seesaw movement should be seated on the first chip table 11c, and a MetaChip is seated onto the second chip table 11d. In this case, it is desirable that a biochip, such as a DataChip, from which the aqueous solution must be removed be seated onto the first biochip 71a placed on the first chip table 11c. Furthermore, in the second embodiment, although the tilting unit 20a has been illustrated as including the linear movable unit 23a and the seesaw unit 22a, the tilting unit 20a may include only the linear movable unit 23a and not a separate seesaw unit. In this case, a process separately discharging the aqueous solution, such as culture fluid, from the first biochip 71a must have been conducted previously to moving the first biochip 71a towards the second biochip 72a using the linear movable unit 23a.

The stamping unit 30a is mounted to the table 10a and includes the rotary unit 31a and the vertical movable unit 32a. The rotary unit 31a functions to rotate the second chip table 11d. The second biochip 72a is seated onto one side of the second chip table 11d. The second chip table 11d onto which the second biochip 72a is seated is rotated by the rotary unit 31a to join the second biochip 72a to the first biochip 71a (refer to FIGS. 6 and 7). The first chip table 11c has no separate rotary unit. The rotary unit 31a is coupled to only the second chip table 11d to rotate the second chip table 11d such that the orientation of a surface of the junction thereof is changed. After the second chip table 11d is oriented by the rotary unit 31a such that the surface of the junction of the second chip table 11d faces a surface of the junction of the first chip table 11c, the second chip table 11d is moved downwards by the vertical movable unit 32a. Thus, the second biochip 72a of the second chip table 11d is joined to the first biochip 71a of the first chip table 11c (refer to FIG. 7). As such, to join the second biochip 72a to the first biochip 71a, it is desirable that a track along which the linear movable unit 23a of the first chip table 11c moves pass through the area of the table 10a on which the vertical movable unit 32a of the second chip table 11d is operated.

The description of the first chip table, the second chip table, the fastening unit, the surrounding condition controller and the control unit of the first embodiment can also be applied to the second embodiment, therefore further explanation is deemed unnecessary.

Figure 8:
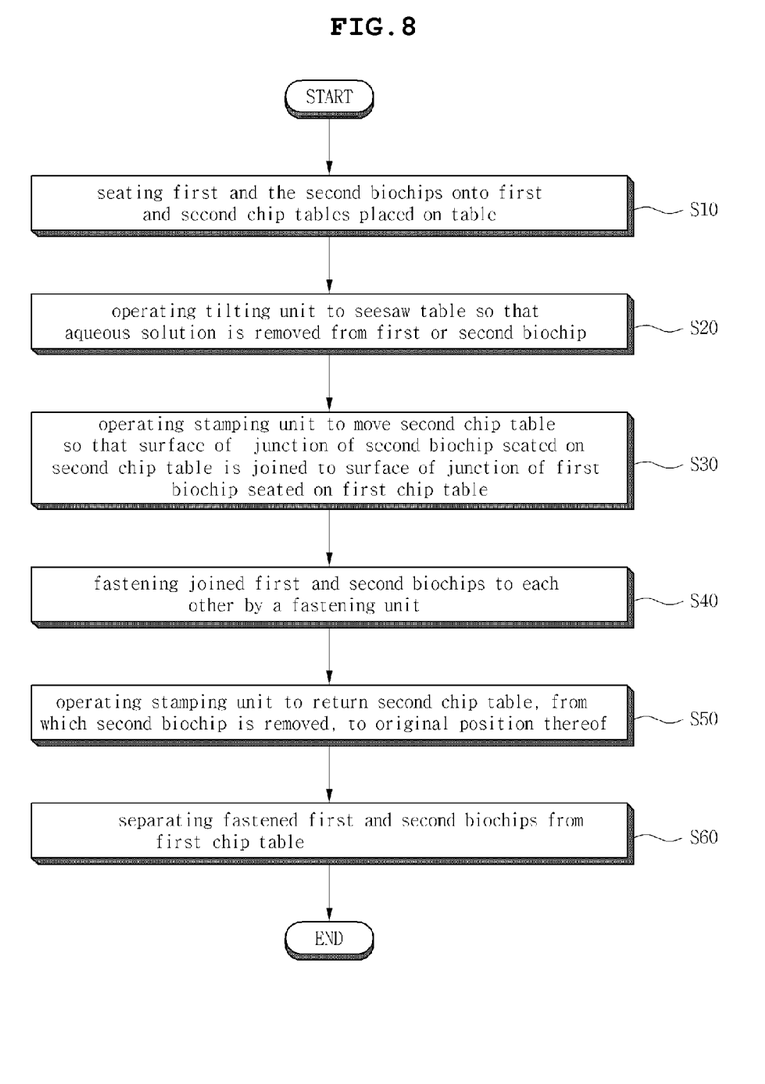
FIG. 8 is a flowchart of a process of operating the stamping apparatus according to the present invention.

FIG. 8 is a flowchart of a method of operating the stamping apparatus according to the present invention. Hereinafter, the method of operating the stamping apparatus will be described with reference to FIG. 8.

In the method of operating the stamping apparatus, at operation S10, the first biochip and the second biochip are respectively seated onto the corresponding surfaces of the first chip table and the second chip table. At operation S20, the tilting unit is operated to remove aqueous solution from the first biochip or the second biochip in such a way as to seesaw the corresponding chip table. At operation S30, the second chip table is operated by the stamping unit so that the surface of the junction of the second biochip placed on the second chip table is joined to the first biochip placed on the first chip table. At operation S40, the first biochip and the second biochip are fastened to each other by the fastening unit. At operation S50, the stamping unit is operated to returning the second chip table, from which the second biochip was removed, to its original position. At operation S60, the first biochip and the second biochip which are joined and fastened to each other are removed from the first chip table.

In detail, in operation S10, the first biochip and the second biochip are respectively seated onto the first chip table and the second chip table. The first biochip and the second biochip may be held on their respective chip tables by vacuum suction force, in which case a suction pump may be used to generate the suction force of the vacuum. Furthermore, the method of holding the biochips on the chip tables is not limited to this one, and other various devices or methods can be used to hold the first and second biochips on the first and second chip tables.

In operation S20, the tilting unit is operated to seesaw the table and thus remove aqueous solution from the first or second biochips by causing the aqueous solution to flow out of the first or second biochip. When the table is moved in a seesaw manner, the first and second chip tables on which the first and second biochips are placed also move like the table in a seesaw manner, allowing the unnecessary aqueous solution, such as culture fluid, to be drained out of the first or second biochip.

In operation S30, the second chip table is operated by the stamping unit. When correctly joining the second biochip to the first biochip so that the interaction therebetween is correct, the first and second biochips must be united together such that the surfaces of the junction between the first and second biochips precisely correspond to each other. Herein, the stamping unit rotates the second chip table or combines rotating with moving the second chip table linearly to correctly join the second biochip of the second chip table to the first biochip placed on the first chip table.

In operation S40, after the first biochip and the second biochip which have been joined together, they are fastened to each other by the fastening unit. This fastening together of the first and second biochips is required so that a more precise result of interaction therebetween can be obtained. The fastening unit fastens the first biochip to the second biochip using the magnets or a clip. In the case of using magnets, a magnet is provided on the surface of the first chip table onto which the first biochip, at operation S10, was placed. Furthermore, at operation S40, another magnet is provided on a surface of the second biochip opposite to the surface of the junction thereof at a position corresponding to the magnet provided on the first biochip such that attractive force is generated between the magnets. The first biochip can be fastened to the second biochip by the attractive force acting between the magnets. The magnet can be provided on the seating surface of the first biochip at any operation and, of course, the magnets may be provided at corresponding positions along with the second biochip, at operation S40.

In operation S50, the second chip table from which the second biochip is separated is returned to its original position by the operation of the stamping unit. Following the fastening of the first biochip to the second biochip, the second chip table is returned to its original position, thus preparing for the operation of seating a subsequent biochip onto the second chip table. In the case where the second biochip has been held to the second chip table by vacuum suction force, the vacuum suction force is first released, and the second biochip is removed from the second chip table, and then the second chip table is returned to its original position.

In operation S60, the first and second biochips which are fastened to each other are separated from the first chip table. That is, in this operation, the biochips on which the stamping process has been performed are collected. Particularly, in the case where the first biochip was held on the first chip table by vacuum suction force, the vacuum suction force is first released, and then the first and second biochips can be collected.

As described above, a stamping apparatus for biochips according to the present invention automates a stamping process of joining a first biochip to a second biochip, thus reducing the time taken to conduct overall testing.

Furthermore, the precision of joining the first biochip to the second biochip and the reliability of a result of interaction between the first and second biochips can be enhanced by the automated stamping process.

In addition, the precise and reliable test can avoid material being wasted, thus reducing the expense of the overall test.

Moreover, the stamping apparatus of the present invention may include a surrounding condition controller so that surrounding conditions, such as the temperature, the humidity, etc., suitable for the first and second biochips can be given during the stamping process.

Although the embodiments of the present invention have been disclosed for illustrative purposes, it will be appreciated that the stamping apparatus for biochips and the method of operating the stamping apparatus according to the invention is not limited thereto, and those skilled in the art will appreciate that various modifications, additions and substitutions are possible, without departing from the scope and spirit of the invention. Accordingly, any and all modifications, variations or equivalent arrangements should be considered to be within the scope of the invention, and the detailed scope of the invention will be disclosed by the accompanying claims.

What is claimed is:

1. A stamping apparatus for biochips, comprising:
    a table;
    a first chip table provided on one side of the table, the first chip table having one side into which a first biochip is seated;
    a second chip table having one side onto which a second biochip is seated;
    a stamping unit comprising a shaft providing a pivot point about the second chip table and connected to a drive motor, the stamping unit configured to rotate the second chip table through the pivot point to correspondingly join a surface of a junction of the first biochip mounted on one surface of the first chip table to a surface of a junction of the second biochip mounted on one surface of the second chip table; and
    a control unit configured to control operations of the stamping unit.

2. The stamping apparatus as set forth in claim 1, further comprising:
    a fastening unit maintaining the joined surfaces of the junctions of the first and second biochips and the fastening unit having magnets which are disposed at the corresponding position of the joined surfaces of the junctions of the first biochip and the second biochip so that the first biochip and the second biochip are aligned by attractive forces,
    wherein the magnets are disposed on the surface of the first chip table where the first biochip is mounted, and the second biochip.

3. A stamping apparatus for biochips, comprising:
    a table;
    a first chip table having one side onto which a second biochip is seated;
    a second chip table having one side onto which a second biochip is seated;
    a linear movable unit mounted to the table to linearly move the first chip table;
    a stamping unit mounted to the table, the stamping unit comprising: a rotary unit pivoting the second chip table; and a vertical movable unit configured to move the second chip table in a vertical direction; and
    a control unit configured to control positions and movements of the first chip table and the second chip table,
    wherein in one position the first chip is linearly moved by a linear movable unit to correspondingly join one surface of the first chip table to one surface of the second chip table, and the second chip table is rotated and vertically moved by the rotary unit and the vertical movable unit.

4. The stamping apparatus as set forth in claim 3, further comprising:
- a fastening unit maintaining the joined surfaces of the junctions of the first and second biochips and the fastening unit having a magnets which are disposed at the corresponding position of the joined surfaces of the junctions of the first biochip and the second biochip so that the first biochip and the second biochip are aligned by attractive forces,
- wherein the magnets are disposed on the surface of the first chip table where the first biochip is mounted, and the second biochip.

5. The stamping apparatus as set forth in claim 1, further comprising registration magnets in the first and second biochips.

6. The stamping apparatus as set forth in claim 3, further comprising registration magnets in the first and second biochips.

\* \* \* \* \*